United States Patent [19]

Lohmann

[11] Patent Number: 4,744,411

[45] Date of Patent: May 17, 1988

[54] MOUNTING ARRANGEMENT OF AN INTERCOOLER

[75] Inventor: Bernard Lohmann, Loeningen, Fed. Rep. of Germany

[73] Assignee: Dr. Ing. h.c.F. Porsche Aktiengesellschaft, Fed. Rep. of Germany

[21] Appl. No.: 905,151

[22] Filed: Sep. 9, 1986

[30] Foreign Application Priority Data

Sep. 7, 1985 [DE] Fed. Rep. of Germany ....... 3531930

[51] Int. Cl.[4] .............................................. F24H 9/06
[52] U.S. Cl. ...................................... 165/41; 165/67; 180/68.1; 248/232
[58] Field of Search ............... 165/41, 51, 67; 60/599; 123/563; 180/68.1, 68.4; 248/213.3, 213.4, 232–234

[56] References Cited

U.S. PATENT DOCUMENTS

| | | | |
|---|---|---|---|
| 2,056,318 | 10/1936 | Hammond | 165/67 X |
| 2,260,594 | 10/1941 | Young | 165/67 X |
| 2,506,051 | 5/1950 | Young | 165/67 |
| 3,165,151 | 1/1965 | Astrup et al. | 165/149 X |
| 3,627,035 | 12/1971 | Astrup | 165/149 X |
| 3,728,856 | 4/1973 | Scherenberg | 60/599 |
| 3,989,103 | 11/1976 | Gieszko et al. | 165/149 X |
| 4,059,080 | 11/1977 | Rudert | 60/599 X |
| 4,140,177 | 2/1979 | Ivie, Sr. | 165/149 |
| 4,196,774 | 4/1980 | Hoffmann | 165/67 |
| 4,258,550 | 3/1981 | Hinkle et al. | 60/599 |
| 4,267,895 | 5/1981 | Eggert Jr. | 180/68.1 |
| 4,519,467 | 5/1905 | Saunders | 165/41 X |
| 4,540,044 | 9/1985 | Lenz | 165/51 X |
| 4,565,177 | 1/1986 | Roettgen et al. | 123/563 |
| 4,619,313 | 10/1986 | Rhodes et al. | 165/67 |

FOREIGN PATENT DOCUMENTS

| | | |
|---|---|---|
| 0052291 | 10/1981 | European Pat. Off. . |
| 660109 | 5/1938 | Fed. Rep. of Germany . |
| 1211501 | 2/1966 | Fed. Rep. of Germany . |
| 2364384 | 7/1975 | Fed. Rep. of Germany ........ 165/67 |
| 2923852 | 12/1979 | Fed. Rep. of Germany . |
| 1122496 | 8/1968 | United Kingdom . |
| 1462265 | 1/1977 | United Kingdom . |
| 1564284 | 4/1980 | United Kingdom . |
| 2080219A | 2/1982 | United Kingdom . |
| 2127363A | 4/1984 | United Kingdom . |

Primary Examiner—Albert W. Davis, Jr.
Assistant Examiner—Richard R. Cole
Attorney, Agent, or Firm—Barnes & Thornburg

[57] ABSTRACT

A mounting for a charging air intercooler which is arranged in a space that is separated from the space surrounding the internal combustion engine. A supporting arrangement serves for the mounting of the charging air cooler which is detachably attached at a wall of the body and is formed by pipe sections of light metal arranged at right angle to one another. Spaced fastening elements are provided between the support arrangement and the charging air intercooler.

20 Claims, 2 Drawing Sheets

MOUNTING ARRANGEMENT OF AN INTERCOOLER

The present invention relates to a mounting of a cooler, preferably of a charging air intercooler in a motor vehicle driven by an internal combustion engine, especially passenger motor vehicle which has a body having at least one space.

A prior art charging air intercooler (DE-OS No. 29 23 852) is coordinated directly to an internal combustion engine whereby its mounting takes place at the housing of the internal combustion engine. This arrangement requires additional volume in the internal combustion engine space of a passenger motor vehicle which is anyhow already dimensioned very small. Additionally, this charging air intercooler renders difficult the access to the internal combustion engine, and its relatively large weight presupposes that complex and therefore costly fastening elements are provided between the same and the internal combustion engine in order to absorb the vibrations occurring during the operation of this engine.

It is an object of the present invention to create a mounting arrangement of a charging air intercooler which is simple in construction and does not impair the accessibility of the internal combustion engine. The charging air intercooler is thereby to be also so arranged that it requires no additional structural space in the space surrounding the internal combustion engine.

The underlying problems are solved according to the present invention in that the mounting of the charging air intercooler takes place independently of the internal combustion engine in the space of the body by means of at least one support arrangement and in that several fastening elements arranged at a distance to one another are provided between the support arrangement and the charging air intercooler.

The principal advantages achieved with the present invention reside in that a good mounting of the charging air intercooler is assured by the support arrangement which is simple in construction, whereby its separation from the internal combustion engine and the space surrounding the engine improves the accessibility to the internal combustion engine and the customarily restricted space conditions which prevail thereat. The distribution of the fastening elements at the charging air intercooler and at the support arrangement effects a functionally correct suspension of the radiator whereby the elastic construction of the fastening elements contributes to the decoupling of the intercooler from the body. The support arrangement which is detachably retained at the wall of the body assures that the different vehicle variations—with and without charging air intercooler—can be realized without having to undertake costly measures in the body.

These and other objects, features and advantages of the present invention will become more apparent from the following description when taken in connection with the accompanying drawing which shows, for purposes of illustration only, one embodiment in accordance with the present invention, and wherein.

Figure 1:
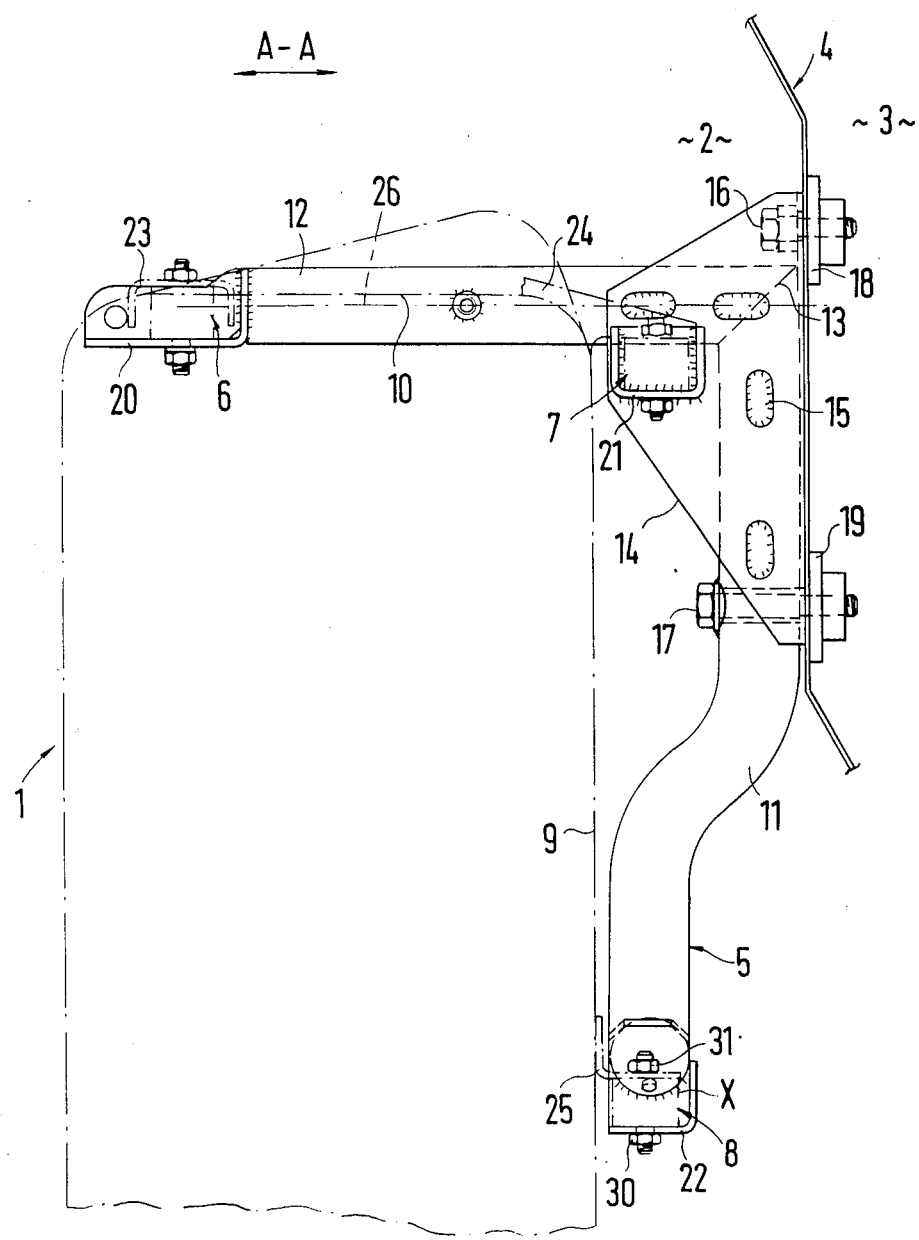
FIG. 1 is an elevational view illustrating a charging air intercooler with a mounting support in accordance with the present invention.

Referring now to the drawing wherein like reference numerals are used throughout the various views to designate like parts, a charging air intercooler generally designated by reference numeral 1 is arranged in a space 2 (FIGS. 1 and 3) of a body of a passenger motor vehicle (not shown). The space 2 which may be a component of a wheel house or wheel well, is separated from the space 3 (FIGS. 1 and 3) in which the internal combustion engine (not shown) is arranged, by a wall 4 of the body.

The charging air intercooler 1 is aligned with its inlet side and its outlet side in the vehicle transverse direction A—A. The mounting of the charging air intercooler 1 which, by reason of the spatial separation of space 3, is independent of the internal combustion engine, takes place by means of a support arrangement generally designated by reference numeral 5 whereby several fastening elements 6, 7 and 8, arranged at a distance from one another are provided between the support arrangement 5 and the charging air intercooler 1.

The support arrangement 5 extends along walls 9 and 10 of the charging air intercooler 1 that are at right angle to one another, whereby the charging air intercooler 1 has the shape of a cubic or prism-like body.

Figure 2:
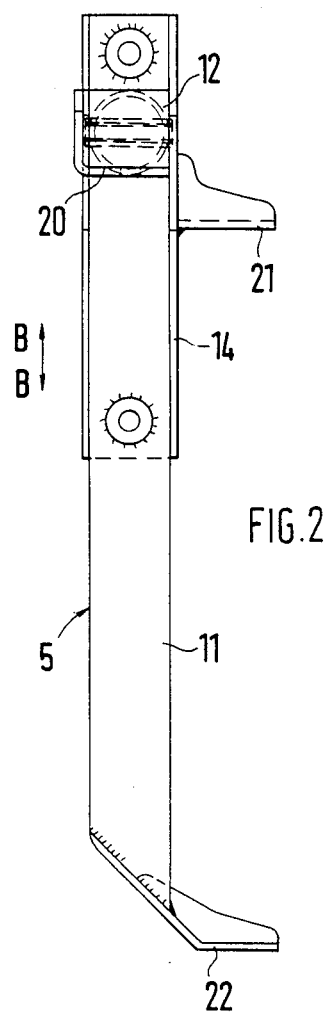
FIG. 2 is a side elevational view of FIG. 1.

The support arrangement 5 consisting of light metal is formed by pipe sections 11 and 12 disposed in a common plane B—B (FIG. 2) which subtend a right angle and are connected with each other by welding at the places 13 (FIG. 1). The two pipe sections 11 and 12 are mutually supported by way of a gusset-like element 14 (FIGS. 1 and 2) which is a structural part U-shaped in cross section and receiving the pipe sections 11 and 12. Openings are provided at 15 in the gusset-like element 14, where it is connected by welding with the pipe sections 11 and 12.

The connection of the support arrangement 5 with the weld takes place by means of bolts 16 and 17. Local reinforcements 18 and 19 are attached at the wall 4 within the area of the bolts 16 and 17.

For receiving the fastening elements 6, 7 and 8, support members 20, 21, 22 respectively, 23, 24 and 25 are provided at the support arrangement 5 and at the charging air intercooler 1.

The support members 23 and 24, are attached at a cover 26 of the charging air intercooler 1; the support member 25 is component of the upright wall 9. The arrangement of the support members 23, 24, 25 is so selected that they rest on the support members 20, 21 and 22 under interposition of the fastening elements 6, 7, and 8.

Figure 4:
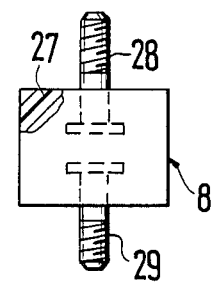
FIG. 4 is an elevational view, partly in cross section, of the detail X of FIG. 1.

Each fastening element, for example, fastening element 8, includes an elastic block 27 with threaded bolts 28 and 29, surrounded by the elastic block (FIG. 4). The threaded bolts 28 and 29 cooperate with threaded nuts 30 and 31 (FIG. 1).

Figure 3:
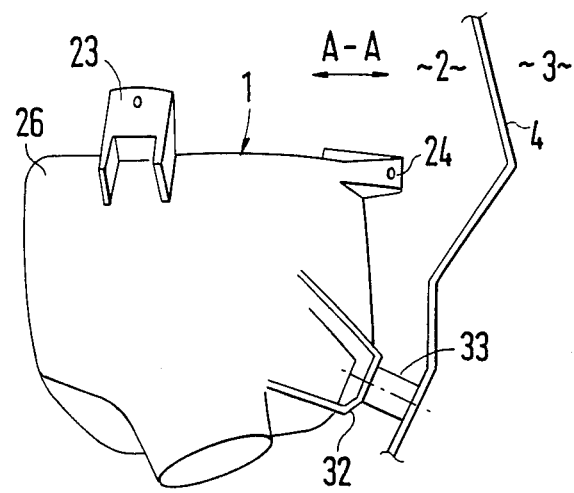
FIG. 3 is a perspective view from above on the charging air intercooler.

According to FIG. 3, the charging air intercooler 1 is additionally retained at the wall 4 by means of a support member 32 and a fastening element 33. The support member 32 is also arranged at the cover 26 and, more particularly, at a distance to the support members 23 and 24.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A support arrangement for the suspension of a cooler by means of elastic fastening elements, particularly of a charge air cooler in a motor vehicle driven by an internal combustion engine, particularly a passenger car, the internal combustion engine being surrounded by lateral wall means, said arrangement comprising:
   only one pair of support parts arranged at a right angle to one another and extending along two adjacent cooler walls, and
   fastening element means for threadably attaching one of the support parts to the lateral wall means surrounding the engine.

2. A support arrangement according to claim 1, wherein the cooler is disposed at the side of the lateral wall means opposite a vehicle engine space.

3. A support arrangement according to claim 1, wherein the cooler is a prism-like structure.

4. A support arrangement according to claim 3, wherein the support parts are formed by pipe sections arranged at an angle to one another.

5. A support arrangement according to claim 4, wherein the support parts consist of light metal.

6. A support arrangement according to claim 4, wherein the pipe sections are mutually supported by a gusset-like element.

7. A support arrangement according to claim 6, wherein the gusset-like element is a structural part U-shaped in cross section and receiving both pipe sections.

8. A support arrangement according to claim 7, wherein the gusset-like element and the pipe sections are connected with each other by welding.

9. A support arrangement according to claim 4, wherein the fastening element means include bolts securing the support parts to the lateral wall means.

10. A support arrangement according to claim 9, wherein the lateral wall means is provided with reinforcing means within the area of the bolts.

11. A support arrangement according to claim 1, further comprising support members provided at the support parts and at the cooler for receiving fastening element means.

12. A support arrangement according to claim 11, wherein said fastening elements are elastically constructed.

13. A support arrangement according to claim 11, wherein said cooler includes an approximately horizontally extending cover, two said support members being provided at said cover while an upright wall of the cooler carries a third support member.

14. A support arrangement according to claim 13, wherein a further support member is provided at the cover which is supported directly at a wall of the vehicle body by way of a fastening element.

15. A support arrangement according to claim 1, wherein the support parts are formed by pipe sections arranged at an angle to one another.

16. A support arrangement according to claim 15, wherein the pipe sections are mutually supported by a gusset-like element.

17. A support arrangement according to claim 16, wherein the gusset-like element is a structural part U-shaped in cross section and receiving both pipe sections.

18. A support arrangement according to claim 16, wherein the gusset-like element and the pipe sections are connected with each other by welding.

19. A support arrangement according to claim 1, wherein the fastening element means include bolts securing the support parts to the lateral wall means.

20. A support arrangement according to claim 19, wherein the wall means is provided with reinforcing means within the area of the bolts.

* * * * *